(12) United States Patent
Gordo Soldevila et al.

(10) Patent No.: US 9,785,855 B2
(45) Date of Patent: Oct. 10, 2017

(54) COARSE-TO-FINE CASCADE ADAPTATIONS FOR LICENSE PLATE RECOGNITION WITH CONVOLUTIONAL NEURAL NETWORKS

(71) Applicant: Xerox Corporation, Norwalk, CT (US)

(72) Inventors: Albert Gordo Soldevila, Grenoble (FR); Jon Almazan, Grenoble (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/972,481

(22) Filed: Dec. 17, 2015

(65) Prior Publication Data

US 2017/0177965 A1    Jun. 22, 2017

(51) Int. Cl.
G06K 9/00 (2006.01)
G06K 9/32 (2006.01)
G06K 9/66 (2006.01)

(52) U.S. Cl.
CPC ............... *G06K 9/325* (2013.01); *G06K 9/66* (2013.01)

(58) Field of Classification Search
USPC .................................................. 382/224–228
See application file for complete search history.

(56) References Cited

U.S. PATENT DOCUMENTS

| | | | |
|---|---|---|---|
| 6,038,337 A | 3/2000 | Lawrence et al. | |
| 6,564,198 B1 * | 5/2003 | Narayan | G06K 9/00369 706/60 |
| 7,016,529 B2 | 3/2006 | Simard et al. | |
| 7,286,699 B2 | 10/2007 | Simard et al. | |
| 7,499,588 B2 | 3/2009 | Jacobs et al. | |
| 7,747,070 B2 | 6/2010 | Puri | |
| 9,008,429 B2 | 4/2015 | Rodriguez-Serrano et al. | |
| 2005/0259866 A1 * | 11/2005 | Jacobs | G06K 9/00463 382/157 |
| 2010/0054539 A1 | 3/2010 | Challa | |
| 2011/0228085 A1 | 9/2011 | Hofman | |
| 2012/0148105 A1 | 6/2012 | Burry et al. | |
| 2013/0004024 A1 | 1/2013 | Challa | |
| 2015/0036920 A1 | 2/2015 | Wu et al. | |
| 2015/0104073 A1 | 4/2015 | Rodriguez-Serrano et al. | |
| 2015/0294175 A1 | 10/2015 | Bala et al. | |

OTHER PUBLICATIONS

U.S. Appl. No. 14/503,539, filed Oct. 1, 2014, Soldevila.

(Continued)

*Primary Examiner* — Alex Liew
(74) *Attorney, Agent, or Firm* — Kermit D. Lopez; Luis M. Ortiz; Ortiz & Lopez, PLLC

(57) ABSTRACT

Methods and systems for license plate recognition utilizing a trained neural network. In an example embodiment, a neural network can be subject to operations involving iteratively training and adapting the neural network for a particular task such as, for example, text recognition in the context of a license plate recognition application. The neural network can be trained to perform generic text recognition utilizing a plurality of training samples. The neural network can be applied to a cropped image of a license plate in order to recognize text and produce a license plate transcription with respect to the license plate. An example of such a neural network is a CNN (Convolutional Neural. Network).

20 Claims, 3 Drawing Sheets

(56) References Cited

OTHER PUBLICATIONS

U.S. Appl. No. 14/794,479, filed Jul. 8, 2015, Soldevila et al.
U.S. Appl. No. 14/601,802, filed Jan. 21, 2015, Soldevila et al.
Almazan, J. et al., "Handwritten Word Spotting with Corrected Attributes," IEEE International Conference on Computer Vision (2013) pp. 1017-1024.
Almazan, J. et al., "Word Spotting and Recognition with Embedded Attributes," IEEE Transactions on Pattern Analysis and Machine Intelligence (2014) 36(12):2552-2566.
Bissacco, A. et al., "PhotoOCR: Reading Text in Uncontrolled Conditions," IEEE International Conference on Computer Vision Dec. 1-8, 2013, Sydney, NSW, pp. 785-792.
Chatfield, K. et al., "Return of the Devil in the Details: Delving Deep into Convolutional Nets," Proceedings of BMVC (2014) 11 pages.
Girschick, R. et al., "Rich feature hierarchies for accurate object detection and semantic segmentation," Computer Vision and Pattern Recognition (2014) 21 pages.
Jaderberg, M. et al., "Synthetic Data and Artificial Neural Networks for Natural Scene Text Recognition," Computer Vision and Pattern Recognition (2014) 10 pages.
Jaderberg, M. et al., "Deep Features for Text Spotting," European Conference on Computer Vision (2014) 17 pages.
Kulis, B. et al., "What You Saw is Not What You Get: Domain Adaptation Using Asymmetric Kernel Transforms," IEEE Conference on Computer Vision and Pattern Recognition (2011) pp. 1785-1792.
Mishra, A. et al., "Scene Text Recognition using Higher Order Language Priors," Proceedings British Machine Vision Conference (2012) pp. 127.1-127.11.
Mishra, A. et al., "Top-Down and Bottom-up Cues for Scene Text Recognition," IEEE Conference on Computer Vision and Pattern Recognition Jun. 16-21, 2012, Providence, RI, pp. 2687-2694.
Neumann, L. et al., "Real-Time Scene Text Localization and Recognition," IEEE Conference on Computer Vision and Pattern Recognition Jun. 16-21, 2012, Providence, RI, 8 pages.
Neuman, L. et al., "Scene Text Localization and Recognition with Oriented Stroke Detection," IEEE International Conference on Computer Vision (2013) Sydney, NSW, Dec. 1-8, pp. 97-104.
Rodriguez-Serrano, J. A. et al., "Label embedding for text recognition," BMVC (2013) 11 pages.
Saenko, K. et al., "Adapting Visual Category Models to New Domains," Proceedings of the 11th European Conference on Computer Vision: Part IV (2010) Springer-Verlag, Berlin, pp. 213-226.
Yao, C. et al., "Strokelets: A Learned Multi-Scale Representation for Scene Text Recognition," IEEE Conference on Computer Vision and Pattern Recognition (2014) Columbus, OH, Jun. 23-28, pp. 4042-4049.
Menotti, D. et al., Vehicle License Plate Recognition with Random Convolutional Networks, 2014 27th SIBGRAPI Conference on Graphics, Patterns and Images, pp. 298-303.
Neubauer, C. et al., License plate recognition with an intelligent camera, SPIE Conference on mobile Robots XIV (1999) 3838:29-38.
Pan, L. et al., Low-quality License Plate Character Recognition Based on CNN, 2015 8th International Symposium on computational Intelligence and Design, pp. 53-58.
Roy, A. et al., Number Plate Recognition for Use in Different Countries Using an Improved Segmentation, Proceedings 2011 2nd National Conference on Emerging Trends and Applications in Computer Science (2011) pp. 1-5.
Zhao, Z. et al., Chinese License Plate Recognition Using a Convolutional Neural Network, 2008 IEEE Pacific-Asia Workshop on Computational Intelligence and Industrial Application, pp. 27-30.
European Search Report dated Apr. 21, 2017 for EP application No. 16202552.2.

\* cited by examiner

COARSE-TO-FINE CASCADE ADAPTATIONS FOR LICENSE PLATE RECOGNITION WITH CONVOLUTIONAL NEURAL NETWORKS

TECHNICAL FIELD

Embodiments are generally related to the field of image processing. Embodiments also relate to object recognition. Embodiments further relate to license plate recognition and neural networks.

BACKGROUND

LPR (License Plate Recognition) or ALPR (Automatic License Plate Recognition) is a computer vision technology that typically includes image-processing operations with functions as the core module of "intelligent" transportation infrastructure applications. License plate recognition techniques, such as ALPR, can be employed to identify a vehicle by automatically reading a license plate utilizing image processing and character recognition technologies. A license plate recognition operations can be performed by locating a license plate in an image, segmenting the characters in the captured image of the plate, and performing an OCR (Optical Character Recognition) operation with respect to the characters identified.

The ALPR problem is often decomposed into a sequence of image processing operations: locating the sub-image containing the license plate (i.e., plate localization), extracting images of individual characters (i.e., segmentation), and performing optical character recognition (OCR) on these character images. Thus, LPR and ALPR technologies involve the problem not just of object recognition, but also text image recognition.

One of the problems with license plate image recognition is that given a cropped image of a license plate, we are interested in producing its transcription. Two main trends exist to address the problem of license plate/text image recognition.

The first trend is based on the aforementioned OCR, which is inspired by traditional word recognition methods in documents. Given a word image, individual characters of the word can first be localized and then recognized via a number of approaches. Although these techniques can obtain very good recognition results, they are not exempt of problems. For example, millions of training words need to be annotated with character bounding boxes to achieve a high accuracy, and the individual characters in the word localized—which is slow and error prone, particularly in the case of license plate recognition, where even the license plate itself may not have been localized and cropped with high accuracy.

The second trend, inspired by recent computer vision techniques, describes word images with global signatures (e.g., bag of words or Fisher vector encodings on top of SIFT or other learned local features) without explicitly detecting the individual characters. With such approaches, one can simultaneously embed word images and text strings in a common space with an associated similarity metric, which allows one to cast the recognition of a word image as a retrieval problem: given a word image, one can rank all possible transcriptions (e.g., the lexicon) and utilize the most similar one to the image word as the predicted transcription.

Although this offers advantages in many domains, for some particular tasks such as license plate recognition, where the number of possible transcriptions is vast, this is not practical, and it is of paramount importance to perform recognition without a known lexicon, a much more difficult task. Some techniques utilize global image signatures, but cast the problem not as retrieval but as an optimization, attempting to find the transcription that maximizes the compatibility function. This method has obtained very good results on internal license plate datasets with no need of a lexicon, although the results were, as expected, not as accurate and efficient as when using a lexicon. In a similar direction, a Convolutional Neural Network can be trained, which learns how to map images of text into a text embedding space from where the actual text string can be easily recovered. In practice, this allows one to perform text image, classification if huge amounts of labeled training data are available, but this is typically not the case, particularly with license plate images.

Given the importance of license plate recognition for different areas of transportation, a solution to recognize license plates with no lexicon in a more accurate and efficient manner that does not require vast amounts of annotated training data is sought.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and systems for object recognition.

It is another aspect of the disclosed embodiments to provide methods and systems for license plate recognition and text recognition thereof.

It is yet another aspect of the disclosed embodiments to provide for recognizing text in cropped images.

The aforementioned aspects and other objectives and advantages can now be achieved as described herein. Methods and systems are disclosed for license plate recognition utilizing a trained neural network. In an example embodiment, a neural network can be generated. The neural network is then subject to operations involving iteratively training and adapting the neural network for a particular task such as, for example, text recognition in the context of a license plate recognition application. The neural network is trained to perform generic text recognition utilizing a plurality of training samples. The neural network can be applied to a cropped image of a license plate in order to recognize text and produce a license plate transcription with respect to the license plate.

In some example embodiments, the neural network can be implemented as a CNN (Convolutional Neural Network). Iteratively learning and adapting the neural network can involve iteratively learning and adapting the neural network by fine-tuning the neural network. Fine-tuning of the neural network in some embodiments can involve the use of a cascade of coarse-to-fine adaptations so as to iteratively learn and adapt the neural network. The neural network is also adapted to perform tasks increasingly similar to license plate recognition in a target set as a part of the training of the neural network.

BRIEF DESCRIPTION OF THE DRAWINGS

The accompanying figures, in which like reference numerals, refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
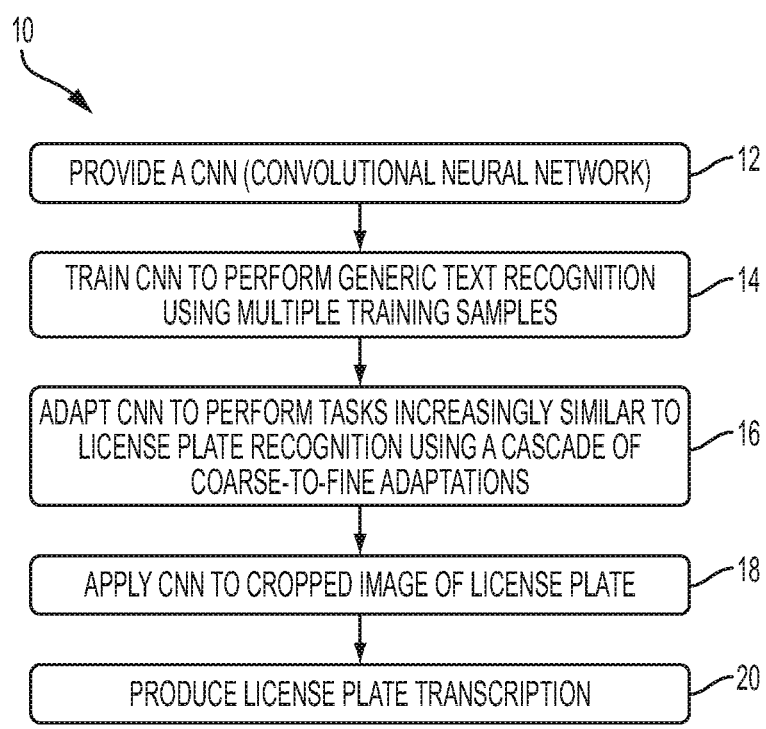
FIG. 1 illustrates a high-level flow chart of operations depicting logical operational steps of a method for coarse-to-fine cascade of adaptations for license plate recognition with a CNN, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments adapt a generic text recognition convolutional network (e.g., convnet) for License Plate (LP) image recognition. Re-using a standard text convnet architecture, for example, and a large-scale synthetic text image dataset yields excellent performance results. The disclosed approach overcomes the large domain gap between the synthetic text images and the LP ones by using a standard convnet model adaptation technique: fine-tuning. This is crucial for performance and can be further improved by subsequent fine-tuning on specific subsets of the target data (e.g., city or parking-specific data to tailor the model to particular conditions). Benefits of this approach include the application of text-image convnets to the problem of License Plate (LP) recognition. In addition, the simple yet efficient domain adaptation techniques required for the successful transfer from text images to LP, based on fine-tuning is very useful.

An example embodiment can be implemented, which involves learning a Convolutional Neural Network (CNN) for the task of license plate recognition. CNNs have shown outstanding results for many tasks related to computer vision, including text recognition without a lexicon, but have not yet been utilized in the context of the task of license plate recognition. One of the main difficulties in training CNNs is the large amount of annotated training data needed to learn a good model. In particular, for license plate recognition, gathering and annotating the large amounts of license plate images necessary for training an accurate CNN model from scratch is unfortunately not feasible. However, for the related task of text recognition, a synthetic dataset containing millions of text images suitable for training is available, and models learned on this dataset have been shown to generalize well to real images and obtain state-of-the-art results on standard text recognition benchmarks. Still, such models perform poorly on the specific task of license plate recognition due to the domain drift.

The disclosed embodiments therefore consider the task of learning a model for license plate recognition as one of supervised domain adaptation, where one tries to adapt a model that performs very well in the task of generic text recognition to the particular task of license plate recognition, for which little training data is available. In particular, we initially demonstrate that utilizing a standard CNN fine-tuning strategy one can already obtain excellent accuracy on the task of license plate recognition, improving over previous approaches.

Such fine-tuning techniques have not been utilized for the complex task of license plate recognition. Note, however, that considering this problem one of source target domain adaptation may be simplistic. One may instead see the target domain of license plate images as a collection of more fine-grained sub domains. For example, license plate images captured by a camera on a parking in Paris will differ from the license plates captured in a highway in the south of France, where both the position and type of the camera and the type of vehicles captured will be different. Although there are clear differences between text and license plates, there are also clear differences between the two sub domains of license plates. Even if learning a generic license plate recognizer is desirable, one may also be interested in specializing the recognizer in a particular sub domain to obtain higher accuracies in that specific sub domain.

In an example embodiment, a technique can be implemented to iteratively learn and adapt a CNN with cascade of coarse-to-fine adaptations, where the network is first trained to, perform generic text recognition leveraging millions of training samples, and then adapted to perform tasks, more and more similar to the license plate recognition in the target dataset. Such an iterative fine-tuning can decrease the error between a 5% and a 10% relative with respect to learning the models using a more standard fine-tuning. The final results significantly outperform prior solutions, both in accuracy and in speed.

One of the main advantages of this approach is that it can perform license plate recognition with high accuracy using a limited amount of annotated license plates, while the original network is only trained for text recognition and performs poorly on the task of license plate recognition. The disclosed approach leverages extra training data, even if it i) comes from a different domain, ii) is faster at testing time, and iii) leads to better accuracy.

Convolutional Neural Networks (CNNs) can yield outstanding results in many tasks related to computer vision, and, amongst them, text recognition. This accuracy, however, comes at a cost. In order to achieve good performance, CNNs need to be trained in a supervised manner with huge amounts of labeled training data, which may be unfeasible depending on the task (e.g., license plate recognition).

For this problem, two standard solutions exist: training on synthetic data and adapting a pre-trained network to the target domain. Regarding training on synthetic data, one can generate realistic synthetic data and use it for training purposes. This approach can be utilized in a variety of domains (e.g., pedestrian localization) and, more related to the disclosed problem, text recognition.

Regarding adapting a pre-trained network to the target domain, if one has access to a network pre-trained with enough training data from a "similar" domain (e.g., a network trained on the ImageNet dataset) and some labeled training samples from the target domain, one can adapt the network (i.e., fine-tune it, as it is known in the community) to the target domain. This can be achieved very easily as CNNs are trained by back propagation. If the source and target tasks are the same (e.g., classification into 20 pre-defined classes) and only a domain shift is available, one can simply update the network weights by back propagation using the target domain training samples. If the tasks are different, one may need to replace entire layers of the network and train those from scratch. Still, results using pre-trained networks from a similar domain tend to yield much better results than learning from scratch with limited training data.

For some scenarios involving adaptation, the target domain actually consists of several different sub domains. These sub domains are more related between them than with the source domain, but are still quite different between them. The disclosed approach can be implemented based on coarse-to-fine adaptation to leverage this hierarchy of target domains and improve the accuracy of the recognition method.

Note that both approaches can be complementary (e.g., training on abundant synthetic data and then performing a fine-tuning for the real target domain). Also note that one of the reasons this simple fine-tuning works well is because the CNN objective is non-convex and is usually solved with Stochastic Gradient Descend. If the objective was convex, directly fine-tuning a network on the target domain would erase all previous knowledge of the source domain unless other techniques (involving, e.g., regularization) were simultaneously used. The non-convex objective is precisely what renders the fine-tuning task easy and effective for CNNs.

The disclosed embodiments focus primarily on the problem of license plate recognition, for which limited annotated training data is available. On the other hand, we have access to large amounts of annotated synthetic training data for word image recognition. One can see how both tasks are essentially the same—recognizing the contents of a text image—and that there is a severe domain drift. Text images and license plates are different both in statistics (e.g., license plates contain plenty of digits and have similar lengths, while dictionary words do not) and in capturing conditions (e.g., license plates may be captured with difficult angles, illumination conditions, and the background texture may be different, etc.).

In reference to an experimental embodiment, it can be first demonstrated that learning a network on a synthetic dataset of text images and then fine-tuning on two license plate datasets leads to very good results. Note, however, that although this can be seen as standard fine tuning, there is no prior use of CNNs for the task of license plate recognition, neither directly nor by leveraging a text image datasets for pre-training and performing fine-tuning.

Second, it can be demonstrated that one should carefully define exactly what is the target domain, and that fine-tuning a network directly to that target domain may not be the best strategy. The domain of license plate images can be considered as a collection of more fine-grained subdomains. For example, the license plate images captured by a camera on a parking in Paris will differ from the license plates captured in a highway in the south of France, where both the position and type of the camera and the type of vehicles captured will be different. This immediately begs the question of what should be the target domain. Should one train on all license plates available, independently of them being from different subdomains? Should one only train on the license plates of the subdomain of relevance? Or, a combination of both?

The network can thus be trained in a coarse-to-fine manner. First, the network can be trained utilizing as much available data as possible from the source domain (e.g., in an experimental embodiment, around 10 million synthetic images of dictionary words). Then, the network can be fine-tuned utilizing all the available samples from the target domain(s), in this case, license plate images, even if they are derived from very different scenarios. Finally, the network can be fine-tuned again with respect to only the target subdomain that we want to recognize.

Experiments can demonstrate that this coarse-to-fine strategy is consistently better than an approaching that involves learning from scratch or fine-tuning only once to a specific dataset or datasets. Although fine-tuning is now standard practice in the computer vision community, prior work does not exist, which, performs iterative fine tuning in a coarse-to-fine manner, neither with CNNs nor with more standard domain adaptation techniques.

Three datasets can be utilized in the context of an experimental embodiment. One of the datasets contains synthetic text images and is used only for training purposes. The other two are in-house datasets of license-place images captured in real scenarios. Such datasets are now described in more detail. It can be appreciated that reference to specific datasets herein is provided for exemplary purposes only and are not considered limiting features of the disclosed embodiments.

The Oxford Synthetic (OS) dataset contains approximately 10 million synthetic images with a coverage of approximately 90,000 different words extracted from a dictionary. The dataset also contains about 1 million validation images (which can be used to validate the parameters of the model) and about 1 million testing images (which are not used). Although the images are synthetic, they are generated in a very realistic manner applying different types of transformations and distortions. Models learned utilizing this dataset generalize very well to real data, obtaining state-of-the-art results in text recognition tasks. It should be noted, however, that as the dataset contains only words from a dictionary, characters are much more common than digits, which are underrepresented. Therefore, we expect a model learned solely on this dataset to perform poorly on the task of license plate recognition, where digits are just as common as characters.

The Wa-dataset (Wa) contains 4,215 training images and 4,215 testing images with 3,282 unique license plates. These license plates are automatically localized and cropped from images capturing the whole vehicle and an automatic perspective transformation has been applied to straighten them. Very bad detections can be manually removed, but license plates partly cropped, misaligned, badly straightened, or with other problems kept in place.

The Cl-dataset (Cl) contains 2,867 training images and 1,381 testing images with 1,891 unique license plates captured in a similar manner than in the Wa-dataset. However, in general, the quality of the license plate images of the Cl-dataset is much worse than that of the Wa-dataset, suffering more problems due to bad detections or misalignments. Except for two customized license plates of 11 characters, all license plates in both datasets contain between 4 and 8 characters.

Note that both license plate datasets contain a limited number of training samples: training a CNN using only these training samples will lead to subpar results. Also worth mentioning is that neither Wa nor Cl contain validation sets.

For training purposes, we can use the same parameters used in the Oxford Synthetic dataset. The only parameter to adjust here is the number of iterations for fine-tuning. Fortunately, the performance on the test set essentially converges after a number of iterations. Therefore, the network can be trained until such a convergence is observed.

In an example embodiment, the network can take as input gray images resited to 32×100 pixels (without preserving the aspect ratio) and run them through a series of convolutions and fully connected layers. In such an example embodiment, the output of the network can be a matrix of size 37×23, wherein every cell denotes the probability of finding each of the 37 possible symbols (e.g., 10 digits, 26 characters, and the NULL symbol) at position 1, 2, . . . 23 in the license plate 1. Given the output of a network, one can easily obtain the transcription by moving through the 23 columns and taking the symbol with the highest probability in each column.

The exact, architecture of the network is a conv64-5, conv128-5, conv256-3, conv512-3, conv512-3, fc4096, fc4096, fc (32×23), where convX-Y denotes a convolution with X filters of size Y×Y, and fcX is a fully connected layer which produces an output of X dimensions. The convolutional filters have a stride of 1 and are padded to preserve the map size. A max-pooling of size 2×2 with a stride of 2 follows convolutional layers 1, 2, and 4. ReLU non-linearities are applied between each pair of layers. The network ends in 23 independent classifiers (one for each position) that perform a softmax and use a cross-entropy loss for training. Although the classifiers are independent of each other, they can be trained jointly together with the remaining parameters of the network.

The network can also be trained by SGD with a momentum of 0.9, fixed learning rate of $5 \times 10^{-5}$ and weight decay of $5 \times 10^{-4}$, with mini batches of size 128. The network is trained for several epochs on Oxford Synthetic until convergence of accuracy on a validation set. When fine-tuning on Wa and Cl, the network is trained for a few hundreds of epochs. It has been observed experimentally that the accuracy of the networks reached a plateau after that point.

In some example embodiments, the disclosed approach can be evaluated on test sets of Wa and Cl. In such a scenario, two measures may be reported: a recognition rate (the percentage of license plates that are transcribed exactly) and a normalized CER (Character Error Rate), the edit distance between the transcription and the ground truth annotation divided by the maximum of their lengths. Models learned—in different setups (e.g., learned from scratch, fine-tuned from Oxford Synthetic, and iteratively fine-tuned) can be evaluated and compared with previous works.

Example results are shown in Table 1 below.

| | Trained Model | Test Dataset Wa | Cl | | Trained Model | Test Dataset Wa | Cl |
|---|---|---|---|---|---|---|---|
| (a) | OCR | 88.59 | 57.13 | (a) | OCR | 2.21 | 25.41 |
| (b) | Other | 90.05 | 78.00 | (b) | Other | 2.1 | 7.0 |
| (c) | OS | 0.00 | 0.00 | (c) | OS | 70.37 | 71.52 |
| (d) | OS + Wa + Cl | 2.75 | 2.02 | (d) | OS + Wa + Cl | 40.65 | 47.97 |
| (e) | W | 84.91 | | (e) | W | 3.78 | |
| (f) | a | | 51.41 | (f) | a | | 18.03 |
| (g) | Wa + Cl | 87.88 | 66.52 | (g) | Wa + Cl | 3.00 | 10.91 |
| (h) | OS → Wa | 95.14 | | (h) | OS → Wa | 1.16 | |
| (i) | OS → Cl | | 80.62 | (i) | OS → Cl | | 6.00 |
| (j) | OS → Wa + Cl | 95.42 | 84.53 | (j) | OS → Wa + Cl | 1.06 | 4.57 |
| (k) | OS → Wa + Cl → Wa | 95.80 | | (k) | OS → Wa + Cl → Wa | 1.00 | |
| (l) | OS → Wa + Cl → Cl | | 84.96 | (l) | OS → Wa + Cl → Cl | | 4.41 |

Fine-tuning operations are denoted with arrows, while merging of datasets can be denoted with a plus sign. For example, "OS→Wa # Cl" denotes a model that was first trained on "Oxford Synthetic" (i.e., OS) and then fine-tuned on a dataset that combines both Wa and Cl. The missing values belong to setups where the testing dataset is not related to the training dataset and where one does not expect a high accuracy.

The following example results are noted. First, a model trained, exclusively on OS (c) does not perform well at all in the task of license plate recognition, achieving 0% recognition accuracy and about a 70 CER. Learning on a combined dataset of OS Wa+Cl (d) does also lead to terrible results (although slightly better). This is not surprising as there are very few license plates compared to the amount of text data in OS.

Second, training on license plate datasets from scratch (e, f, g) performs much better, particularly when both Wa and Cl datasets are combined. However, this does not leverage all the knowledge that could be obtained from OS and the results are still below what was achieved in previous works.

Learning a model on OS and then fine-tuning on the license plate datasets (h, i, j) leads to superior results and outperforms previous work. For (j) we improve the accuracy of the system by almost 6 points in Wa and Cl and reduce the CER by almost 50%. Interestingly, fine-tuning the model on Wa+Cl lead to superior results both on Wa and Cl (j), despite forcing the model to learn to recognize license plates that will not be similar to the ones seen at testing time. We believe that this is because more training data is available and the fine-tuning can take advantage of it.

Iterative fine-tuning (k, l), where the network learned on OS is first fine-tuned on Wa+Cl and then fine-tuned again on Wa or Cl leads to the best results. Intuitively, the network leveraged all the information about text in general provided by OS, all the information about license plates in general provided by Wa+Cl, and finally specialized on the actual target task, obtaining the best results. This approach further reduces the recognition error by almost a 10% relative on Wa (k) and by a 3% relative on Cl (l). Similar improvements can be observed for the CER.

FIG. 1 illustrates a high-level flow chart of operations depicting logical operational steps of a method 10 for coarse-to-fine cascade of adaptations for license plate recognition with a CNN, in accordance with one example embodiment. The method 10 depicted in FIG. 1 considers the task of learning a model for license plate recognition as one of supervised domain adaptation, where one tries to adapt a model that performs very well in the task of generic text recognition to the particular task of license plate recognition, for which little training data is available. As indicated previously, by using a standard CNN fine-tuning strategy one can already obtain excellent accuracy on the task of license plate recognition, improving over previous work.

The approach of method 10 includes a step or logical operation of providing a CNN, as indicated at block 12. Thereafter, as depicted at block 14, the CNN can be trained to perform generic text recognition by leveraging multiple (e.g., millions) training samples. The operations shown at blocks 12 and 14 involve training of the CNN. This operation (i.e., the training) occurs once. The operations shown at blocks 16, 18, 20, however, may occur many times (e.g., at testing times).

Thus, as illustrated at block 16, a step or logical operation can be implemented to adapt the CNN to perform tasks increasingly similar to license plate recognition utilizing a cascade of coarse-to-fine adaptations. The resulting CNN can then be applied as shown at block 18 to a cropped image of a license plate to produce, as shown at block 20, a license plate transcription. To be clear, the training operations occur only once (i.e., at training time). That is, one first trains the CNN using first the generic text examples and then the license plate images. These operations are performed only once. Then, one can apply the trained CNN to any number of cropped images of new license plates to obtain their transcriptions, with no need to retrain the network each time.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (e.g., through the Internet via an Internet Service Provider). An example of such a network is the network 220 shown in FIG. 4.

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
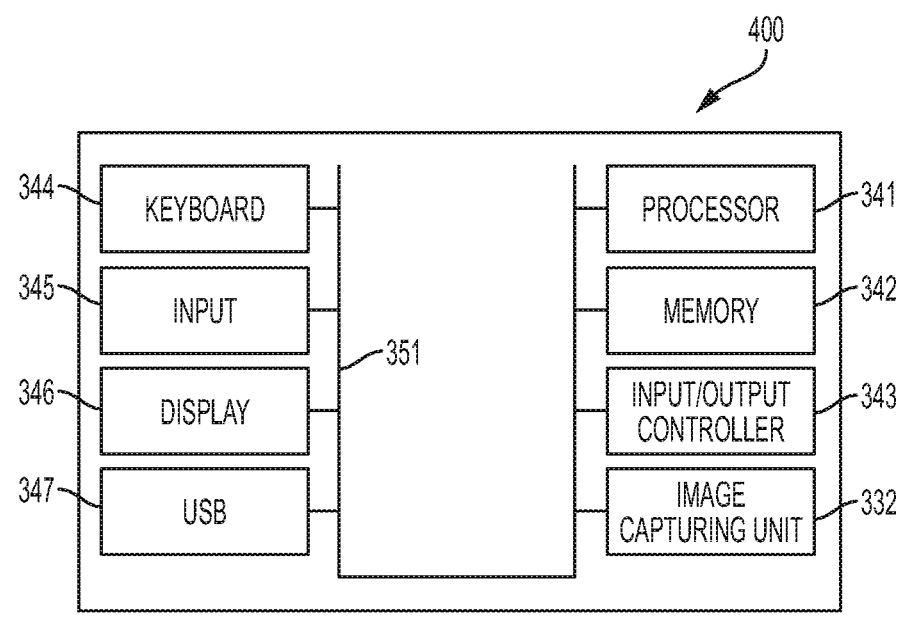
FIG. 2 illustrates a schematic view of a computer system, in accordance with an example embodiment.
Figure 3:
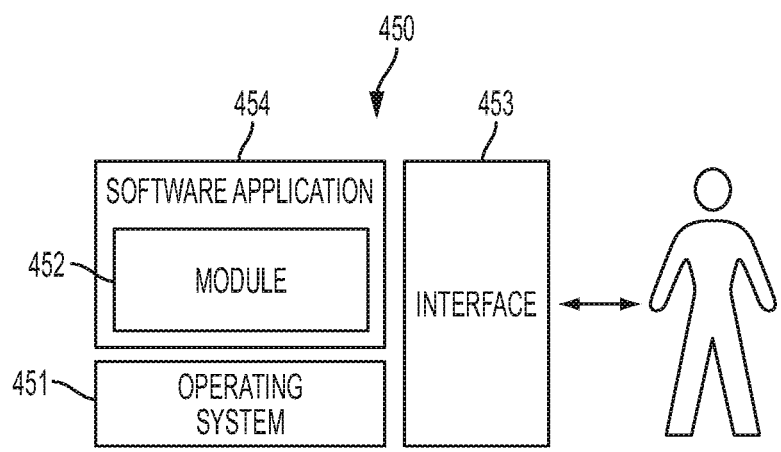
FIG. 3 illustrates a schematic view of a software system including a module, an operating system, and a user interface, in accordance with an example embodiment.

FIGS. 2-3 are provided as exemplary diagrams of data-processing environments in which embodiments may be implemented. It should be appreciated that FIGS. 2-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 2, some embodiments may be implemented in the context of a data-processing system 400 that can include one or more processors such as processor 341, a memory 342, a controller 343 (e.g., an input/output controller), a peripheral USB (Universal Serial Bus) connection 347, a keyboard 344 (e.g., a physical keyboard or a touchscreen graphically displayed keyboard), an input component 345 (e.g., a pointing device, such as a mouse, track ball, pen device, which may be utilized in association or with the keyboard 344, etc.), a display 346, and in some cases, an image-capturing unit 332 (e.g., a digital video camera, an ALPR camera, etc.). Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation.

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on.

FIG. 3 illustrates a computer software system 450 for directing the operation of the data-processing system 400 shown in FIG. 2. Software application 454, stored for example in memory 342, generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as, for example, a module 452, which can, for example, implement instructions or operations such as those described herein. Examples of instructions that can be implemented by module 452 include steps or operations such as those shown and described herein with respect to blocks 12, 14, 16, 18, 20 of FIG. 1 and described elsewhere herein. Note that module 452 may be composed of sub-modules, such as, for example, the modules 232, 234, 236, 238, and/or 239 described herein with respect to FIG. 4.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" such as module 452 shown in FIG. 3 constitutes a software application. However, a module may also be composed of, for example, electronic and/or computer hardware or such hardware in combination with software. In some cases, a "module" can also constitute a database and/or electronic hardware and software that interact with such a database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIG. 1, for example, and discussed elsewhere herein can be implemented in the context of such a module or modules, sub-modules, and so on.

FIGS. 2-3 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Figure 4:
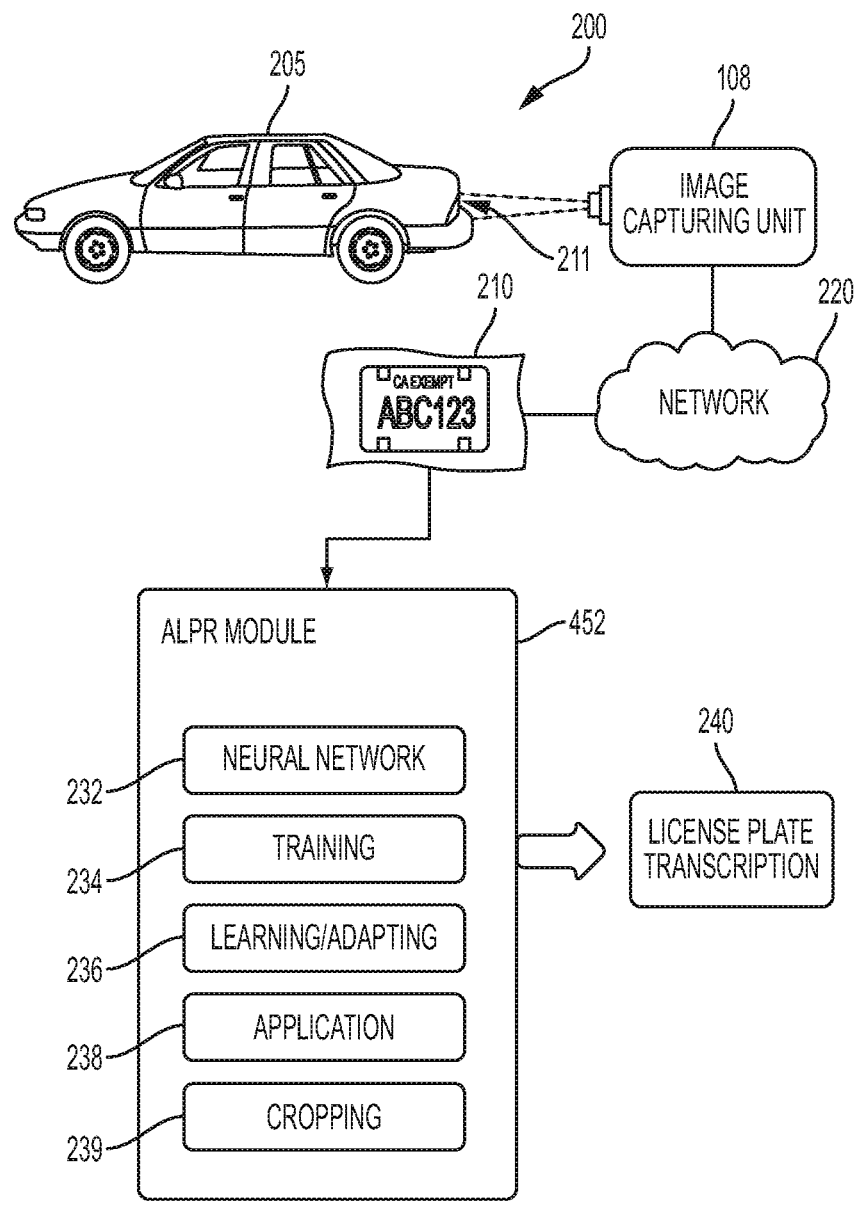
FIG. 4 illustrates a block diagram of a system for license plate recognition, which can be implemented in accordance with an example embodiment.

FIG. 4 illustrates a block diagram of a system 200 for license plate recognition, which can be implemented in accordance with an example embodiment. The system 200 generally includes an image-capturing unit 108, which communicates either directly (e.g., wired connection) or wirelessly with a network 220. The network 220 shown in FIG. 4 may employ any network topology, transmission medium, or network protocol. Network 220 may include connections such as wire, wireless communication links, fiber optic cables, and so forth. Network 220 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The network 220 (e.g., a wireless "WiFi" network, a cellular communications network, the Internet, etc.) can communicate directly (e.g., wired connection) or via wireless communications with an ALPR unit, which in some embodiments, can be a data-processing system 400 such as disclosed in FIGS. 2-3. The ALPR unit can include an ALPR module 452. Such an ALPR module 452 can be stored in, for example, a memory such as memory 342 shown in FIG. 2 and processed via a processor such as, for example, processor 341 also depicted in FIG. 2.

The image-capturing unit 108 can be, for example, an ALPR camera or other digital video camera and can capture an image 210 of, for example, a license plate 211 of a vehicle 205. The image 210 may be provided to the ALPR module 452 as a cropped image or an uncropped image, depending upon design considerations.

In the example shown in FIG. 4, image 210 can be transmitted via the network 220 to the ALPR unit for processing by the ALPR module 452. The ALPR module 452 includes one or more modules (or sub-modules), such as, for example, a neural network 232 (e.g., a CNN as described previously or another type of neural network) and a training module 234 for training such a neural network to perform generic text recognition utilizing a plurality of training samples as discussed previously herein. The ALPR module 452 can further include a learning/adapting module 236 for iteratively learning and adapting the neural network. The ALPR module 452 can also include an application module 238 for applying the neural network to a cropped image of the license plate 211 in order to recognize text and produce a license plate transcription 240 with respect to the license plate 211. Assuming that the image 210 of the license plate 211 is provided to the ALPR module 452 as an uncropped image, an image cropping module 239 can be utilized via the ALPR module 452 to crop such an image which is then subject to processing by the other modules 232, 234, 236, and/or 238 of the ALPR module 452.

As indicated previously, the training operations occur only once (i.e., at training time). That is, one first trains the neural network 232 utilizing first the generic text examples and then the license plate images. These operations are performed only once. Then, one can apply the trained neural network 232 to any number of cropped images of new license plates to obtain the license plate transcription, with no need to retrain the neural network 232 each time.

Note that one non-limiting example of an image cropping approach that can be utilized to implement the image cropping module 239 is disclosed in U.S. Patent Application Publication No. 2015/0294175, which is incorporated herein by reference in its entirety and is entitled "Methods and Systems for Efficient Image Cropping and Analysis," which published on Oct. 15, 2015 to Raja Bala et al., and is assigned to Xerox Corporation.

Based on the foregoing, it can be appreciated that a number of example preferred and alternative embodiments are disclosed herein. In one example embodiment, a method for license plate recognition is disclosed. Such a method can include steps or logical operations for generating a neural network; training the neural network to perform generic text recognition utilizing a plurality of training samples; iteratively learning and adapting the neural network; and applying the neural network to a cropped image of a license plate in order to recognize text and produce a license plate transcription with respect to the license plate. In a preferred example embodiment, the aforementioned neural network 232 can be a CNN (Convolutional Neural Network). It can be appreciated, of course, that other types of neural networks can be implemented in lieu of a CNN.

In another example embodiment, a step or operation can be implemented for adapting the neural network to perform tasks increasingly similar to license plate recognition in a target set as a part of training the neural network. In some example embodiment, the step or logical operation of iteratively learning and adapting the neural network can involve a step or logical operation of iteratively learning and adapting the neural network by fine-tuning the neural network. In another example embodiment, the step or logical operation of fine-tuning the neural network can include a step or logical operation for utilizing a cascade of coarse-to-fine adaptations so as to iteratively learn and adapt the neural network. In still another example embodiment, a step or logical operation can be provided for adapting the neural network to perform tasks increasingly similar to license plate recognition in a target set as a part of training the neural network.

In another example embodiment, a system for license plate recognition can be implemented. Such a system can include, for example, at least one processor and a computer-usable medium embodying computer program code, the computer-usable medium capable of communicating with the processor (or processors). The computer program code can include instructions executable by the processor and configured for: generating a neural network; training the neural network to perform generic text recognition utilizing a plurality of training samples; iteratively learning and adapting the neural network; and applying the neural network to a cropped image of a license plate in order to recognize text and produce a license plate transcription with respect to the license plate.

In yet another example embodiment, a non-transitory processor-readable medium storing code representing instructions to cause a process for license plate recognition can be implemented. Such code can include code to, for example: generate a neural network; train the neural network to perform generic text recognition utilizing a plurality of training samples; iteratively learn and adapt the neural network; and apply the neural network to a cropped image of a license plate in order to recognize text and produce a license plate transcription with respect to the license plate.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for license plate, recognition, said method comprising:

generating a neural network having a plurality of convolutional filters and at least one fully connected layer and wherein said neural network ends in a plurality of independent classifiers, wherein although said classifiers among said plurality of independent classifiers are independent of one another, said classifiers are capable of being trained jointly together with remaining parameters of said neural network;

training said neural network in a coarse-to-fine manner to perform generic text recognition utilizing a plurality of training samples;

iteratively learning and adapting said neural network; and applying said neural network to a cropped image of a license plate in order to recognize text associated with said license plate and produce a license plate transcription with respect to said license plate.

2. The method of claim 1 wherein said neural network comprises a CNN (Convolutional Neural Network).

3. The method of claim 2 further comprising adapting said neural network to perform tasks increasingly similar to license plate recognition in a target set as a part of training said neural network and wherein said plurality of independent classifiers utilize a cross-entropy loss for said training of said neural network.

4. The method of claim 1 wherein iteratively learning and adapting said neural network, further comprises: iteratively learning and adapting said neural network by fine tuning said neural network.

5. The method of claim 3 wherein said fine tuning said neural network comprises utilizing a cascade of coarse-to-fine adaptations so as to iteratively learn and adapt said neural network.

6. The method of claim 2 further comprising adapting said neural network to perform tasks increasingly similar to license plate recognition in a target set as a part of training said neural network.

7. The method of claim 2 wherein:
iteratively learning and adapting said neural network, further comprises: iteratively learning and adapting said neural network by fine tuning said neural network wherein said fine tuning said neural network comprises utilizing a cascade of coarse-to-fine adaptations so as to iteratively learn and adapt said neural network, wherein said coarse-to-fine manner includes said cascade of coarse-to-fine adaptations and wherein said fine tuning further includes utilizing all available samples from a target domain even if said all available samples are derived from different scenarios, and wherein said neural network is subsequently fine-tuned again with respect to only a target subdomain that is desired to be recognized.

8. A system for license plate recognition, said system comprising:
at least one processor; and
a computer-usable medium embodying computer program code, said computer-usable medium capable of communicating with said at least one processor, said computer program code comprising instructions executable by said at least one processor and configured for:
generating a neural network having a plurality of convolutional filters and at least one fully connected layer and wherein said neural network ends in a plurality of independent classifiers, wherein although said classifiers among said plurality of independent classifiers are independent of one another, said classifiers are capable of being trained jointly together with remaining parameters of said neural network;
training said neural network in a coarse-to-fine manner to perform generic text recognition utilizing a plurality of training samples;
iteratively learning and adapting said neural network; and
applying said neural network to a cropped image of a license plate in order to recognize text associated with said license plate and produce a license plate transcription with respect to said license plate.

9. The system of claim 8 wherein said neural network comprises a CNN (Convolutional Neural Network).

10. The system of claim 9 wherein said instructions are further configured for adapting said neural network to perform tasks increasingly similar to license plate recognition in a target set as a part of training said neural network and wherein said plurality of independent classifiers utilize a cross-entropy loss for said training of said neural network.

11. The system of claim 8 wherein said instructions for iteratively learning and adapting said neural network, further comprises instructions configured for iteratively learning and adapting said neural network by fine tuning said neural network.

12. The system of claim 11 wherein said fine tuning said neural network comprises utilizing a cascade of coarse-to-fine adaptations so as to iteratively learn and adapt said neural network.

13. The system of claim 9 wherein said instructions are further configured for adapting said neural network to perform tasks increasingly similar to license plate recognition ire a target set as a part of training said neural network.

14. The system of claim 9 wherein:
said instructions for iteratively learning and adapting said neural network are further configured for: iteratively learning and adapting said neural network by fine tuning said neural network wherein said fine tuning said neural network comprises utilizing a cascade of coarse-to-fine adaptations so as to iteratively learn and adapt said neural network, wherein said coarse-to-fine manner includes said cascade of coarse-to-fine adaptations and wherein said fine tuning further includes utilizing all available samples from a target domain even if said all available samples are derived from different scenarios, and wherein said neural network is subsequently fine-tuned again with respect to only a target subdomain that is desired to be recognized.

15. A non-transitory computer-readable medium storing code representing instructions to cause a process for license plate recognition, said code including code to:
generate a neural network having a plurality of convolutional filters and at least one fully connected layer and wherein said neural network ends in a plurality of independent classifiers, wherein although said classifiers among said plurality of independent classifiers are independent of one another, said classifiers are capable of being trained jointly together with remaining parameters of said neural network;
train said neural network in a coarse-to-fine manner to perform generic text recognition utilizing a plurality of training samples;
iteratively learn and adapt said neural network; and
apply said neural network to a cropped image of a license plate in order to recognize text associated with said license plate and produce a license plate transcription with respect to said license plate.

16. The non-transitory computer-readable of claim 15 wherein said neural network comprises a CNN (Convolutional Neural Network).

17. The non-transitory computer-readable of claim 16 wherein said code further includes code to adapt said neural network to perform tasks increasingly similar to license plate recognition in a target set as a part of training said neural network and wherein said plurality of independent classifiers utilize a cross-entropy loss for said training of said neural network.

18. The non-transitory computer-readable of claim 15 wherein iteratively learning and adapting said neural network, further comprises: iteratively learning and adapting said neural network by fine tuning said neural network.

19. The non-transitory computer-readable of claim 18 wherein said fine tuning said neural network comprises utilizing, a cascade of coarse-to-fine adaptations so as to iteratively learn and adapt said neural network.

20. The non-transitory computer-readable of claim 16 wherein said code further includes code to adapt said neural network to perform tasks increasingly similar to license plate recognition in a target set as a part of training said neural network and wherein said iteratively learn and adapt said neural network further comprises iteratively learning and adapting said neural network by fine tuning said neural network wherein said fine tuning said neural network comprises utilizing a cascade of coarse-to-fine adaptations so as to iteratively learn and adapt said neural network, wherein said coarse-to-fine manner includes said cascade of coarse-to-fine adaptations and wherein said fine tuning further includes utilizing all available samples from a target domain even if said all available samples are derived from different scenarios, and wherein said neural network is subsequently fine-tuned again with respect to only a target subdomain that is desired to be recognized.

* * * * *